United States Patent
Kravitz et al.

(10) Patent No.: US 10,979,418 B2
(45) Date of Patent: Apr. 13, 2021

(54) TEMPLATE-BASED DISTRIBUTED CERTIFICATE ISSUANCE IN A MULTI-TENANT ENVIRONMENT

(71) Applicant: International Business Machines Corporation, Armonk, NY (US)

(72) Inventors: David W. Kravitz, San Jose, CA (US); Dulce B. Ponceleon, Palo Alto, CA (US); Diego A. Masini, La Plata (AR); John B. Geagan, III, San Jose, CA (US); Brian K. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/540,942

(22) Filed: Aug. 14, 2019

(65) Prior Publication Data
US 2019/0372965 A1 Dec. 5, 2019

Related U.S. Application Data

(63) Continuation of application No. 15/631,093, filed on Jun. 23, 2017, now Pat. No. 10,425,399.

(Continued)

(51) Int. Cl.
| | |
|---|---|
| *H04L 29/06* | (2006.01) |
| *H04L 9/32* | (2006.01) |
| *G06F 21/64* | (2013.01) |
| *G06F 21/60* | (2013.01) |
| *H04L 9/08* | (2006.01) |
| *G06F 21/10* | (2013.01) |

(52) U.S. Cl.
CPC ........ *H04L 63/0823* (2013.01); *G06F 21/602* (2013.01); *G06F 21/64* (2013.01); *G06F 21/645* (2013.01); *H04L 9/0836* (2013.01); *H04L 9/0841* (2013.01); *H04L 9/3236* (2013.01); *H04L 9/3263* (2013.01); *H04L 9/3268* (2013.01); *H04L 63/10* (2013.01); *G06F 21/10* (2013.01); *H04L 2209/38* (2013.01); *H04L 2209/56* (2013.01)

(58) Field of Classification Search
CPC . H04L 63/0823; H04L 9/0836; H04L 9/0841; H04L 9/3236; H04L 9/3263; H04L 9/3268; H04L 63/10; G06F 21/602; G06F 21/64; G06F 21/645
See application file for complete search history.

(56) References Cited

U.S. PATENT DOCUMENTS

| | | |
|---|---|---|
| 6,671,804 B1 | 12/2003 | Kent |
| 9,292,707 B1 | 3/2016 | Fontecchio |

(Continued)

OTHER PUBLICATIONS

Web Service security Tutorial, snapshot Aug. 6, 2015, 14 pages (Year: 2015).*

(Continued)

*Primary Examiner* — Oleg Korsak

(57) ABSTRACT

One example method may include generating a template transaction certificate by one or more entities which verify proof of ownership of attributes incorporated into the template transaction certificate, and generating one or more operational transaction certificates by the one or more entities which verified proof of ownership of the template transaction certificate.

20 Claims, 9 Drawing Sheets

Related U.S. Application Data

(60) Provisional application No. 62/361,432, filed on Jul. 12, 2016.

(56) References Cited

U.S. PATENT DOCUMENTS

| | | |
|---|---|---|
| 2010/0325441 A1 | 12/2010 | Laurie et al. |
| 2014/0337239 A1 | 11/2014 | Nawaz et al. |
| 2015/0059003 A1 | 2/2015 | Bouse |
| 2015/0188898 A1 | 7/2015 | Chow et al. |
| 2016/0044035 A1 | 2/2016 | Huang |
| 2016/0283941 A1 | 9/2016 | Andrade |
| 2016/0342994 A1 | 11/2016 | Davis |
| 2017/0041296 A1 | 2/2017 | Ford et al. |
| 2017/0046698 A1 | 2/2017 | Haldenby et al. |
| 2017/0111175 A1 | 4/2017 | Oberhauser et al. |
| 2017/0155655 A1 | 6/2017 | Spaulding et al. |
| 2017/0195336 A1 | 7/2017 | Ouellette |
| 2017/0228372 A1 | 8/2017 | Moreno et al. |
| 2017/0366348 A1 | 12/2017 | Weimer et al. |

OTHER PUBLICATIONS

List of IBM Patents or Patent Applications Treated as Related, Sep. 14, 2019.

David W. Kravitz et al., "Template-Based Distributed Certificate Issuance in a Multi-Tenant Environment", U.S. Appl. No. 15/631,093, filed Jun. 23, 2017.

David W. Kravitz et al., "Template-Based Distributed Certificate Issuance in a Multi-Tenant Environment", U.S. Appl. No. 628361,432, filed Jul. 12, 2016.

Adams et al.; "RFC 3161"; Aug. 2001; 26 pages.

Anonymous; QAI Transaction Certificate (TC); May 30, 2014.

Lewis, "A gently introduction to digital tokens" Sep. 28, 2015, 13 pages.

Nguyen et al., "Protocol Specification", GitiHub, May 20, 2016.

* cited by examiner

Audit Tree – Key Hierachy

- $PreK^{(3)}_{ABS}$
  available to auditors of { automobile, banking, construction }

---

- $PreK^{(2)}_A = HMAC(\, PreK^{(3)}_{ABC},\, \text{"automobile"}\, )$
  available to auditors of { automobile }

- $PreK^{(2)}_B = HMAC(\, PreK^{(3)}_{ABC},\, \text{"banking"}\, )$
  available to auditors of { banking }

- $PreK^{(2)}_C = HMAC(\, PreK^{(3)}_{ABC},\, \text{"construction"}\, )$
  available to auditors of { construction }

---

- $PreK^{(1)}_{Bank} = HMAC(\, PreK^{(2)}_B,\, \text{"Bank"}\, )$
  available to auditors of banking who cover specifically { Bank }

---

- $PreK^{(0)}_{AffiliationID}(TCertID) = PreK^{(0)}_{Bank}(TCertID = \text{"17"}) =$ $= HMAC(\, PreK^{(1)}_{AffiliationID = \text{"Bank"}},\, TCertID = \text{"17"}\, ) = K_{TCertID, AffiliationID}$ available to the TCert owner who's affiliated with "Bank"
  [which was part of the enrollmentID, specified in the Ecert].

FIG. 1D

TEMPLATE-BASED DISTRIBUTED CERTIFICATE ISSUANCE IN A MULTI-TENANT ENVIRONMENT

BACKGROUND

A time-sequenced immutable database, for example implemented using block chain technology is a distributed database that is implemented using a plurality of nodes. The nodes each maintain a copy of a sequentially growing list or ledger of data records or query one or more other nodes. An example of a block chain implementation is a public ledger used for crypto-currency transactions. The data of a block chain may be protected by encryption and may include data other than crypto-currency transactions, e.g., smart contracts may be implemented using a block chain.

The functionality of block chain technology has garnered much interest; however, widespread adoption of such technology has been hindered by reservations regarding anonymous transactions and a lack of clarity as to which entities are involved in a transaction, their past contributions to the database, and their authority to act in certain transactions.

BRIEF SUMMARY

In summary, one aspect of the application provides a method for token management in a multi-tenant transactional database, comprising: utilizing at least one processor to execute computer code that performs the steps of: receiving a request for one or more tokens to be used by an entity; verifying that the entity is qualified to receive the one or more tokens for use on the multi-tenant transactional database; and responsive to the verifying, issuing, using a processor associated with a database management device, the one or more tokens for use by the entity in association with a transaction in the multitenant transactional database; each of the one or more tokens comprising a function of a public key that corresponds to a private key associated with a token of the one or more tokens.

Another aspect of the application provides an apparatus for token management in a multi-tenant transactional database, the apparatus comprising: at least one processor; and a computer readable storage medium having computer readable program code embodied therewith and executable by the at least one processor, the computer readable program code comprising: computer readable program code that receives a request for one or more tokens to be used by an entity; computer readable program code that verifies that the entity is qualified to receive the one or more tokens for use on the multi-tenant transactional database; and computer readable program code that thereafter issues the one or more tokens for use by the entity in association with a transaction in the multi-tenant transactional database; each of the one or more tokens comprising a function of a public key that corresponds to a private key associated with a token of the one or more tokens.

An additional aspect of the application provides a computer program product for token management in a multi-tenant transactional database, the computer program product comprising: a computer readable storage medium having computer readable program code embodied therewith that is executable by at least one processor, the computer readable program code comprising: computer readable program code that receives a request for one or more tokens to be used by an entity; computer readable program code that verifies that the entity is qualified to receive the one or more tokens for use on the multi-tenant transactional database; and computer readable program code that thereafter issues the one or more tokens for use by the entity in association with a transaction in the multi-tenant transactional database; each of the one or more tokens comprising a function of a public key that corresponds to a private key associated with a token of the one or more tokens.

A further aspect of the application provides a method for token management in a multi-tenant transactional database, comprising: utilizing at least one processor to execute computer code that performs the steps of: receiving, at a database management device, a request for one or more tokens to be used by an entity; verifying, using a processor associated with the database management device, that the entity is qualified to receive the one or more tokens for use on the multi-tenant transactional database, the verifying comprising inspection of an enrollment certificate, wherein issuance and consequent availability of the enrollment certificate requires proof of identifying characteristics of the entity; responsive to the verifying, issuing, using a processor associated with the database management device, the one or more tokens for use by the entity in association with a transaction in the multi-tenant database; each of the one or more tokens comprising a function of a public key that corresponds to a private key associated with a token of the one or more tokens; receiving, by the database management device, a request pertaining to the entity; using, by the database management device, enrollment information that is contained within the enrollment certificate associated with the entity to identify a plurality of transactions; forming, by the database management device, a response to the request pertaining to the entity; and issuing, by the database management device, the response to one or more requesting entities.

Another aspect of the application provides a method for token management in a multi-tenant transactional database, comprising: utilizing at least one processor to execute computer code that performs the steps of: obtaining access information regarding an entity to inspect tokens stored on the multi-tenant transactional database; using the access information to inspect the tokens stored on the multi-tenant transactional database; and thereafter obtaining a response comprising data relating to one or more transactions of the entity linked by the access information and the one or more tokens stored on the multi-tenant transactional database.

Another aspect of the application provides a method that includes generating a template transaction certificate by one or more entities which verify proof of ownership of attributes incorporated into the template transaction certificate, and generating one or more operational transaction certificates by the one or more entities which verified proof of ownership of the template transaction certificate.

Another aspect of the disclosure includes an apparatus that includes a processor configured to generate a template transaction certificate by one or more entities which verify proof of ownership of one or more attributes incorporated into the template transaction certificate, and generate one or more operational transaction certificates by the one or more entities which verified proof of ownership of the template transaction certificate.

Still another aspect of the disclosure includes a non-transitory computer readable storage medium configured to store instructions that when executed cause a processor to perform generating a template transaction certificate by one or more entities which verify proof of ownership of one or more attributes incorporated into the template transaction certificate, and generating one or more operational transaction certificates by the one or more entities which verified proof of ownership of the template transaction certificate.

For a better understanding of exemplary embodiments of the application, together with other and further features and advantages thereof, reference is made to the following description, taken in conjunction with the accompanying drawings, and the scope of the claimed embodiments of the application will be pointed out in the appended claims.

BRIEF DESCRIPTION OF THE SEVERAL VIEWS OF THE DRAWINGS

FIG. 1D illustrates details of the audit tree key hierarchy attributes.

DETAILED DESCRIPTION

Figure 1A:
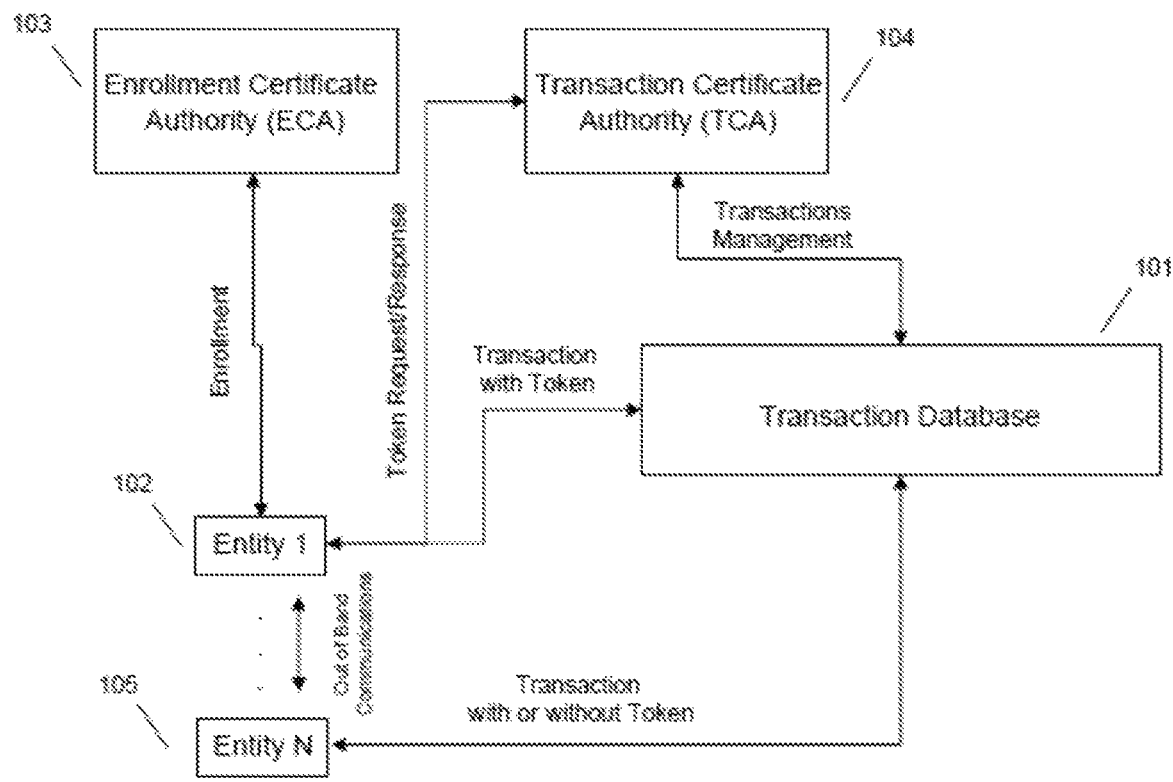
FIG. 1A illustrates an example system overview.

It will be readily understood that the components of the embodiments of the application, as generally described and illustrated in the figures herein, may be arranged and designed in a wide variety of different configurations in addition to the described exemplary embodiments. Thus, the following more detailed description of the embodiments of the application, as represented in the figures, is not intended to limit the scope of the embodiments of the application, as claimed, but is merely representative of exemplary embodiments of the application.

Reference throughout this specification the term "embodiment" means that a particular feature, structure, or characteristic described in connection with the embodiment is included in at least one embodiment of the application. Thus, appearances of the phrases which include the term "embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the application. One skilled in the relevant art may well recognize, however, that embodiments of the application can be practiced without at least one of the specific details thereof, or can be practiced with other methods, components, materials, et cetera. In other instances, well-known structures, materials, or operations are not shown or described in detail to avoid obscuring aspects of the application.

The illustrated embodiments of the application will be best understood by reference to the figures. The following description is intended only by way of example and simply illustrates certain selected exemplary embodiments of the application as claimed herein. It should be noted that the flowchart and block diagrams in the figures illustrate the architecture, functionality, and operation of possible implementations of systems, apparatuses, methods and computer program products according to various embodiments of the application. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

It is desirable to expand the use of time-sequenced immutable databases, for example ones that are constructed using block chain technology, beyond digital currency transactions and asset transfers that are conducted anonymously or pseudonymously. However, traditional methods of dealing with business requirements (such as knowing the customer) are seemingly incompatible with making effective use of such block chains.

Hardening of a block chain database for B2B, business to business, bank to bank, and bank to business transactions introduces a requirement that membership services are adequately addressed. This entails reconciling the apparently conflicting goals of (a) maintaining privacy (e.g., by customizing release of information about transacting parties and securing knowledge of which transactions cluster, e.g., according to having one or more transacting parties in common) and (b) meeting business security needs associated with controlling access to proprietary information while still effectively conducting business and accommodating all industry and regulatory requirements (including routine audits and compliance with authorized regulatory or related activities).

Well-known block chain technologies have been designed without an underlying identity management backbone. Thus, an embodiment provides an identity, attribute and reputation management framework that is fully compatible with block chain based databases. An embodiment furthermore uses transactions on the block chain as a feedback mechanism to manage reputations going forward. In an embodiment, tokens are attached to transactions so that automated processing via block chain logic can analyze the tokens of a transacting entity, e.g., to determine whether contractual requirements have been met. The structure of such tokens is tailored to flexibly accommodate varied policies while efficiently handling key management and minimizing the need for out-of-band communications.

Referring now to FIG. 1A, an entity 102 (e.g., business, individual) may use a client device to request one or more tokens for use in transacting on a transaction database 101, e.g., block chain. A token request includes a request by a member or authenticated entity (TCertOwner herein), e.g., an entity that has been issued an enrollment certificate by an enrollment certificate authority 103 (ECA herein).

A request for tokens, specifically for a token embodying a transaction certificate (TCert herein) generated by a transaction certificate authority 104 (TCA) includes an enrollment certificate issued to the entity, which in turn includes an enrollment identification (EnrollID herein). The enrollment identification is proven to, e.g., the ECA 103, during an enrollment phase.

The entity 102 request(s) for tokens is signed using an enrollment private key (EnrollPriv_Key herein), where the enrollment public key (EnrollPub_Key herein) is included in the enrollment certificate obtained from the ECA 103. The request includes the requested batch size, i.e., a number of tokens with TCerts to be generated and delivered. The requested batch size may or may not be included in the request, and the requested batch size may or may not be honored by the TCA 104.

The TCA 104 will evaluate the request and issue a response to the entity 102. If the 102 entity is permitted to receive token(s), as determined for example from evaluation of the entity's identification information, reputation score, attributes, etc., as further described herein, the TCA 104 will issue token(s) in response to the request. The TCA's 104 response includes a batch of tokens with TCerts, and a key derivation function (KDF) key, TCertOwner_KDF_Key herein, which is a key generated by applying the keyed-hash message authentication (HMAC) algorithm or construction using a key, TCA_HMAC_Key herein, which is generated by or otherwise available to the TCA 104 (and appropriate delegates). Hence TCertOwnerKDF_Key is generated as HMAC(TCA_HMAC_Key, EnrollPub_Key), where the notation HMAC(K, text) denotes the application of the HMAC function to text using key K, where a cryptographic hash function such as SHA-384 may be used as the underlying one-way hash function that is called by the HMAC algorithm. If SHA-384 is used in this capacity, then the resultant TCertOwnerKDF_Key may be considered to be a key of bit-length equal to 384. This TCertOwnerKDF_Key is delivered to the entity 102 by the TCA 104 within a response to a request for the batch of tokens. Here, TCertOwnerKDF_Key is applied within a key derivation function (KDF), e.g., based on HMAC or other key derivation technique to derive additional keying material from the secret key, TCertOwner_KDF_Key.

Additional keying material derived using TCertOwner_KDF_Key includes TCertOwnerEncrypt_Key, a 256-bit key used by the TCA 104 to generate an encrypted field of the token with TCert that can be decrypted by the entity 102, and Expansion_Key, a 384-bit key that is used to generate a 384-bit ExpansionValue. The TCertOwnerEncrypt_Key is an encryption and decryption key obtained by a key derivation function, e.g., as [HMAC(TCertOwnerKDF_Key, "1")]256-bit truncation, where "1" is some representation of the integer 1 and the truncation extracts 256 bits of the 384 bits that comprise HMAC (TCertOwnerKDF_Key, "1"). Expansion_Key is obtained by a key derivation function, e.g., as HMAC(TCertOwnerKDF_Key, "2"), where "2" is some representation of the integer 2 as distinct from "1". A transaction certificate index, TCertIndex herein, is preferably comprised of the concatenation of (i) a timestamp (assigned by the TCA 104), (ii) a value that is randomly or pseudo-randomly generated by the TCA 104, and (iii) a counting mechanism (e.g., a counter reinitialized to 1 for each new batch of tokens). ExpansionValue is generated as HMAC(Expansion Key, TCertIndex). In order to enable a token with TCert to optionally include means to allow targeted release of certain data fields incorporated into the token with TCert, a 384-bit TCertInfoExportKDF_Key can be generated as HMAC(TCertOwnerKDF_Key, "3"), where "3" is some representation of the integer 3 as distinct from "1" and "2". HMAC (TCertOwnerKDF_Key, "3") can be used to generate one or more keys, each of which can be used to encrypt one or more data fields. For example, a 256-bit EncryptEnrollID_Key derived as [HMAC(TCertInfoExportKDF_Key, TCertID "1")]256-bit truncation]] can be used for targeted release of EnrollID if EnrollID appears within a token with TCert as AES_EncryptEncryptEnrollID_Key(EnrollID), that is, as an encryption of the EnrollID value where such encryption is executed using the advanced encryption standard (AES) algorithm with key EncryptEnrollID_Key.

The token's transaction certificate (TCert) basic structure enables a digital signature generation capability for the entity 102 that is used for (or in association with) transacting on the transaction database 101. For example, the basic structure includes a transaction certificate identification (herein TCertID), which is preferably unique to the TCert. Further included is an encrypted field referred to as AES_EncryptTCertOwnerEncrypt_Key(TCertIndex||EnrollPub_Key||EnrollID), where the value comprised of the string TCertIndex||EnrollPub_Key||EnrollID, where || denotes concatenation is operated upon using an encryption algorithm. This field is generated using the key TCertOwnerEncrypt_Key with an encryption algorithm (e.g., AES algorithm).

The basic structure also includes a capability of the TCA 104 to cluster or link (i.e., identify or associate) transactions made by a transacting entity 102 using the token(s). For example, the structure includes the result of using an AES encryption key that is generated by or otherwise available to the TCA 104 (and appropriate delegates), TCA_Encrypt_Key herein, that is used to encrypt the TCertIndex, EnrollPub_Key and EnrollID, i.e., as AES_EncryptTCA_Encrypt_Key(TCertIndex||EnrollPub_Key||EnrollID). This permits the TCA 104 to use TCA_Encrypt_Key for access to TCertIndex, EnrollPub-Key, and EnrollID to identify transactions linked to entity's 102 issued tokens.

Further, a transaction certificate public key (TCertPub_Key herein) or a function thereof is included in the basic structure, and a validity period mechanism may be included (ValidityPeriodCtr herein), which may include an increasing counter that is updatable by the TCA 104 via the block chain (transaction database 101) or other mechanism; such counter may be used in lieu of date or time intervals.

An entity's 102 enrollment identification (EnrollID) may be released by the entity 102 by encrypting the aforementioned EncryptEnrollID_Key using a key available to the intended recipient, if the TCA 104 has included within the token with TCert the aforementioned AES_EncryptEnrollID_Key(EnrollID). The TCA 104 may, for purposes of auditability, encrypt TCertIndex, EnrollPub_Key, and/or EnrollID (alone, in combination, or in part), in order to gain or grant access to transaction information without necessarily requiring the use of TCA_Encrypt_Key or TCA_HMAC_Key.

The TCA 104 delivers the requested tokens to the entity 102 or makes them otherwise available and the entity 102 may examine the enrollment identification, in this example, AES decryption of: AES_EncryptTCertOwnerEncrypt_Key (TCertIndex∥EnrollPub_Key∥EnrollID) to determine if one or more of the tokens is valid, i.e., whether or not the enrollment identification included is that of the requesting entity 102. If valid, the receiving entity 102 may use one or more of the tokens in transacting on the transaction database 101 by digitally signing using one or more of the TCert-Priv_Key values as signature generation private keys. This is possible because TCertPriv_Key, which is computable by TCertOwner entity 102 using TCertOwnerKDF_Key (retrieved from the token batch response) and generated/stored EnrollPriv_Key, is equal to (EnrollPriv_Key+ExpansionValue) modulo n, where n may defined by a known specification and where TCertIndex, extracted via AES decryption of: AES_EncryptTCertOwnerEncrypt_Key (TCertIndex∥EnrollPub_Key∥EnrollID) is usable to recover ExpansionValue if properly generated as HMAC(Expansion_Key, TCertIndex). Expansion_Key is recoverable using TCertOwnerKDF_Key, where e.g., Expansion_Key is equal to HMAC(TCertOwnerKDF_Key, "2"). It is possible for other entities, e.g., entity N 105, to likewise receive entity-specific tokens, i.e., via completing an enrollment process via ECA 103 and receiving a batch of tokens from TCA 104. However, in an embodiment, it is not required that the entities 102, 105 use the tokens on the database. Not using the tokens, however, may negatively impact an entity's ability to establish membership/enrollment, and will preclude the entity from taking part in attribute and reputation management, as further described herein. As such, other entities may not be willing to transact with an entity that uses transaction database 101 without proper tokens. In an embodiment, transaction database 101 may be a closed system, i.e., requiring tokens for transactions to be placed therein.

In addition to the basic TCert fields included in the token structure, additional fields may be included. For example, the TCA 104 and/or appropriate delegate may wish to look at specific transactions (e.g., in order to obtain a reputation score included in a token, in order to obtain an attribute included in a token, etc.) or to link specific transactions, e.g., transactions involving a given entity 102 or set of entities. For example, TCA 104 may wish to look at specific transactions in order to compile a reputation score and/or attribute(s) by examining a series of transactions submitted by or otherwise involving the entity as a party to a transaction, e.g., entity 102. An entity may submit a transaction that includes TCerts in addition to its own as a means, for example, of specifying which entities are authorized to invoke the transaction in order to perform certain operations, for example, such as to execute code included within and/or referenced by the transaction. Such invocation may entail one or more entities submitting a transaction that is digitally signed using TCertPriv_Key that corresponds to TCertPub_Key contained within a TCert that has been included within the transaction that is now being invoked. Attributes and/or reputation scores may be incorporated into a TCert as AES_EncryptEncryptAttributes_Key(Attribute(s) Reputation Score(s)), where, for example, EncryptAttributes_Key is generated as [HMAC(TCertInfoExportKDF_Key, TCertID "2")]256-bit truncation.

Figure 1B:
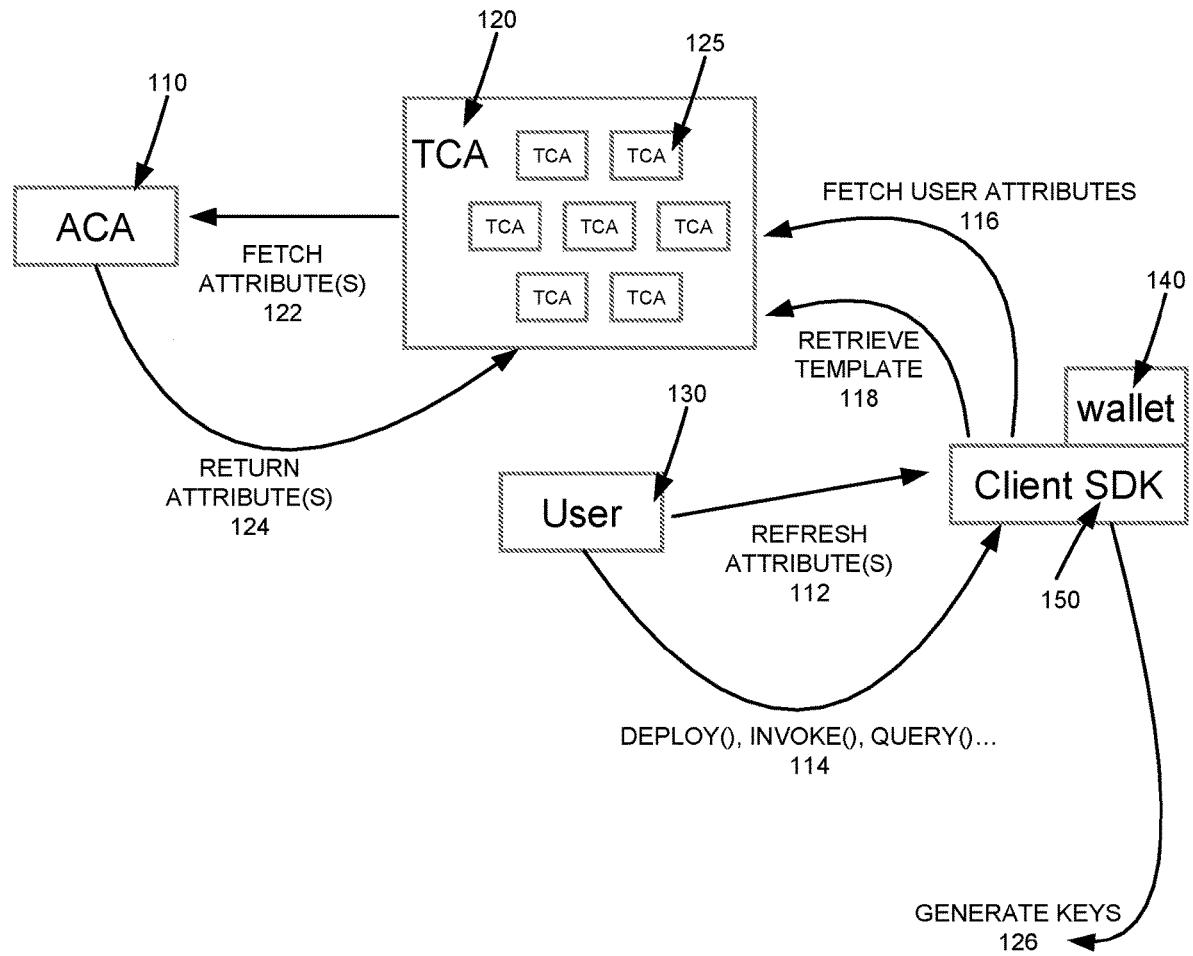
FIG. 1B illustrates a distributed token certificate authority for distribution of template transaction certificates.

FIG. 1B illustrates a distributed token certificate authority for distribution of template transaction certificates. Referring to FIG. 1B, the attribute certificate authority communicates with the token certificate authority which is represented as a split component with a primary TCA that carries the registration authority and the initial/template issuance functionality. Additionally, a secondary component of the TCA includes a subordinate TCA or a set of subordinate TCAs/client SDKs that use a template certificate to generate operational transaction certificates. For example, the main TCA may create a token as a template and the template can be customized to include attributes which are proven by the subordinate TCA parties.

According to one example of using identity as a service (IDaaS), assume the user has several security assertion markup language (SAML) assertions. The system would use those assertions to fetch attributes by triggering a refresh of attributes. The actual TCert would be generated during the Deploy/Invoke/Query operations performed by the client software development kit (SDK). However, the TCert generated by the TCA would no longer be used as a regular TCert, instead it will be a template. Regarding revocation, the revocation list would be performed by the primary TCA.

According to an example of operation, a first phase Init/Refresh_Attributes( ) during this phase the user device 130 can specify the required attributes by informing the ClientSDK to refresh attribute information 112. The user can trigger this mechanism multiple times by providing different attributes each time. For the Fetch_User_Attributes( ) function 116, the ClientSDK 150 will start a separated execution flow in background to periodically contact the TCA 120 to refresh the user attributes. For the Fetch_Attributes( ) function, the TCA will contact the ACA 110 to fetch attributes 122 from external systems. After fetching attributes from the external system, the ACA will return an ACert 124 to the TCA with the attributes the user device and/or profile has at that moment. This could be the exact attributes the user provided or a subset of those attributes if the user doesn't have all of them. The flow is an independent flow of execution from the actual transaction execution flow. When the ClientSDK requests for a template 118, the TCA would provide a template with the attributes from the last update. The user sends a Deploy( ), Invoke( ) or Query( ) request 114 to the ClientSDK to initiate the procedure. The Client SDK 150 checks if the user has a valid TCert template. If the user does not have a TCert template, or has an expired template, then the Client SDK will request a template TCert to the TCA=i.e., 'getTemplate( )' and the TCA will generate template TCert and sign it using a threshold signature because it is not a single TCA but a distributed TCA 125. The Client SDK 150 has a TCert template 118 and accesses a low level of the Pre-K tree, which is Pre-K^1 166 (see FIG. 1C.). In general, the scope of its jurisdiction has to include the affiliation of the user and the user's enrollment private key/public key and the key derivation function key (i.e., KDF Key (TCert_owner_root_key)). When the Client SDK 150 receives the TCert template 125 needed to verify the TCA signature of the template. If it can verify the information, then the Client SDK 150 will generate the needed keys 126 to access the information from the template by performing the key derivation from the Pre-k tree. It also needs to decrypt the TCertIndex by performing the key derivation. The wallet 140 may be part of the Client SDK 150 and may be used to perform transactions based on the described security measures.

Once all the information is accumulated, the TCert will be created following the distributed ledger TCA current procedure and the Client SDK will create the TCertIndex by concatenating the timestamp from the TCertIndex in the TCert template, including a new random value and a counter. Alternatively, every Client SDK can have its own ID number which can be used as a prefix. The TCert can be signed using the Client SDK private key. Each Client SDK will have a different key pair. Now that there are multiple subordinate TCAs (the ClientSDKs), it is important that these subordinate TCAs do not modify the end time of the validity period, otherwise they would be superseding its authorization. The primary TCA 120 is essentially acting as a registration authority. Subordinate TCAs 125 are merely following commands. The Client SDK 150 is a subordinate TCA 120. Each one should have its own certificate pair. It is possible to have more than one Client SDK for a given jurisdiction in order to achieve availability and avoid a single point of failure. The root of the PreK tree can be generate by the primary TCAs.

Assuming the user has several security assertion markup language (SAML) assertions. The system would use those assertions to fetch attributes by triggering a refresh of the user attributes 116. The actual TCert would be generated during the Deploy/Invoke/Query operations 114 by the client SDK 122. However, the TCert generated by the TCA 120 would no longer be used as a regular TCert, in this model it is a template 125 which can be modified, occupied and/or changed. Regarding revocation, the revocation list would be performed by the primary TCA. In an example of a user attribute update flow, a function to 'Init/Refresh_Attributes( )' 112 can be performed so the user can specify the required attributes by informing the ClientSDK 150 to refresh its attribute information. The user can trigger this mechanism multiple times by providing different attributes each time. The 'Fetch_User_Attributes( )' function 116 may include the ClientSDK 150 starting a separated execution flow in the background to periodically contact the TCA 120 to refresh 112 the user attributes. The 'Fetch_Attributes( )' function 122 may include the TCA 120 contacting the ACA 110 to fetch attributes from external systems. After fetching attributes from an external system, the ACA 110 will return an ACert 124 to the TCA with the attributes the user has at that moment. This could be the exact attributes the user provided or a subset of those attributes if the user does not have all of them. The flow of operations 114-126 is an independent flow of execution from the actual transaction execution flow.

When the ClientSDK requests for a template, the TCA would provide a template with the attributes from the last update. The user may send a Deploy( ), Invoke( ) or Query ( ) request to the ClientSDK. The Client SDK checks if the user has a valid TCert template. If the user does not have a TCert template, or he has an expired template, then the Client SDK requests a template TCert to the TCA=, i.e. getTemplate( ) and the TCA will generate template TCert and sign it using threshold signature because it is not a single TCA but a distributed TCA.

At this point the Client SDK has a TCert template and access to the lowest level of the Pre-K tree, which is Pre-K^1. In general, the scope of the Client SDK jurisdiction has to include the affiliation of the user. The Client SDK also include the user's enrollment private key/public key and a key derivation function key (i.e. KDF_Key (TCert_owner_root_key)). When the Client SDK receives the TCert template it needs to verify the TCA signature of the template. If verified, it will generate the needed keys to access the information from the template (by performing the key derivation from the Pre-k tree). It also needs to decrypt the TCertIndex by performing the key derivation. Once all the information is collected, the Client SDK will create one TCert following a TCA procedure. The Client SDK will create the TCertIndex by concatenating the timestamp from the TCertIndex in the TCert template, a new random value and a counter. Alternatively, every Client SDK can have its own ID number and it can be used as a prefix. The TCert can be signed using a Client SDK private key. Each client SDK will have a different key pair. Now that there are multiple subordinate TCAs (i.e., the ClientSDKs), the subordinate TCAs do not modify the end time of the validity period, otherwise they would be superseding its authorization. The primary TCA is essentially acting as a registration authority. Subordinate TCAs are not the authorities and are responsible for mere tasks. The Client SDK is a subordinate TCA. Each one of them should have its own certificate pair. It is possible to have more than one Client SDK for a given jurisdiction in order to achieve the high availability and avoid the single point of failure. The root of the PreK tree can be generated by the primary TCAs.

Figure 1C:
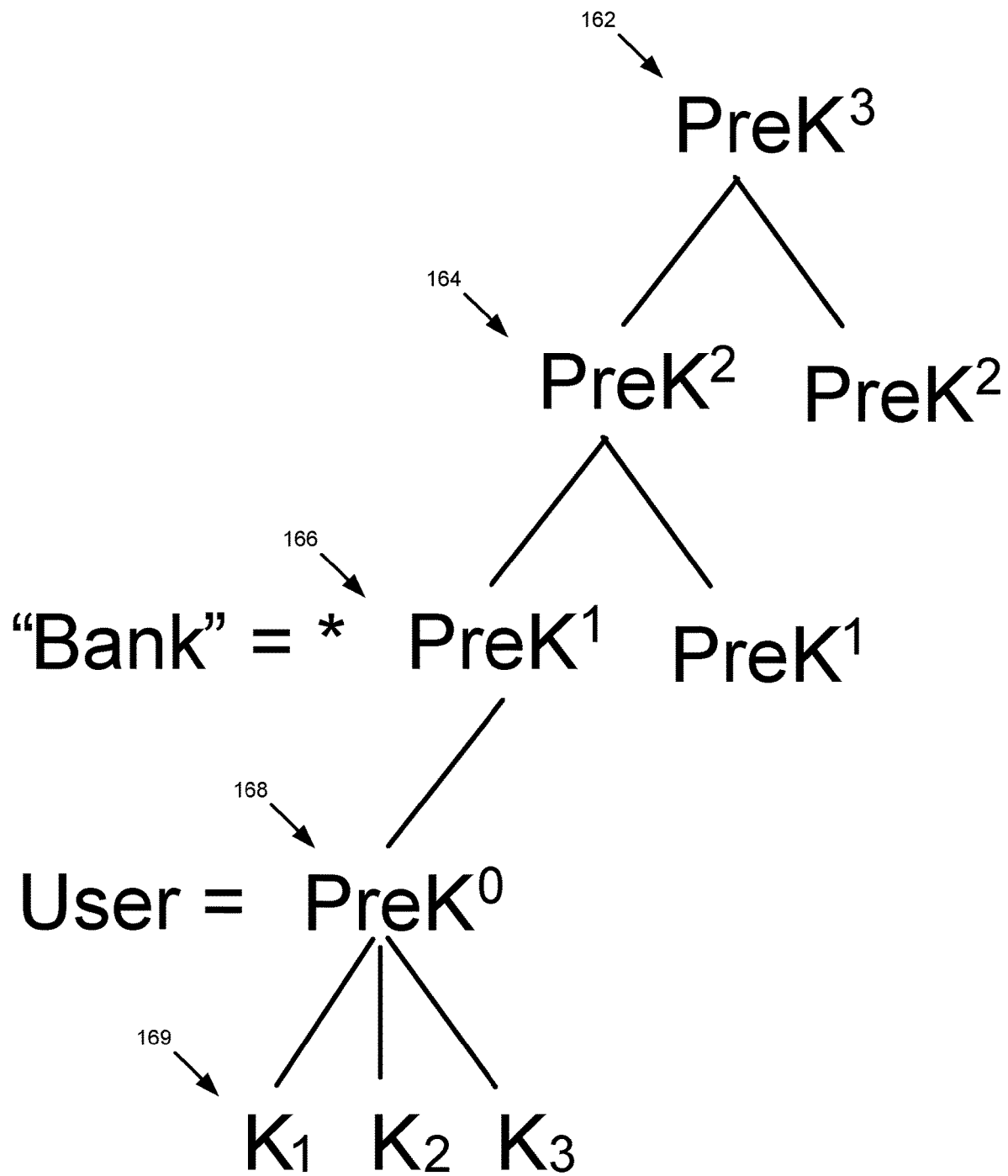
FIG. 1C illustrates an audit tree key hierarchy.

FIG. 1C illustrates an audit tree key hierarchy. Referring to FIG. 1C, the Client SDK has access to the lowest level 168 of the preK tree which is available to the user and includes data elements 169. In this example of a user being part of an authorization hierarchy of data, the K elements may include user information, such as an address, social security number, birth date, etc. In operation a user may send a refer command to the Client SDK and a deploy, invoke and/or query command and as a result, the TCA may attempt to fetch attributes from the ACA. The Client SDK will verify a TCA signature or template TCert, generate needed keys to access information from the template, such as key derivations and decryption information and crate a TCert. The TCert can be signed using the client's SDK private key. Each client SDK will have a different key pair. The Client SDK will create the TCert Index by concatenating the timestamp from the index in the TCert template and include a new random value and counter. The next level of the tree from the bottom may include the bottom level 168 which references the user. The bank 166 may be part of the next level which may have access to some attributes. The TCA root key may be the next levels up 162 and the corresponding data 164.

FIG. 1D illustrates details of the audit tree key hierarchy attributes. Referring to FIG. 1D, the example attributes are shown for each level of the hierarchy. The information attributes are specifically made available to the auditors with the proper credentials. For example, the top of the tree 172 represents auditors who may be seeking to authorize a loan. The next level down 174 may be the individual auditors. The next level down may be the auditors 176 of the specific institution and the last level 178 may be the TCert owner affiliated with the entity institution as part of the enrollment ID in the ECert.

Figure 1E:
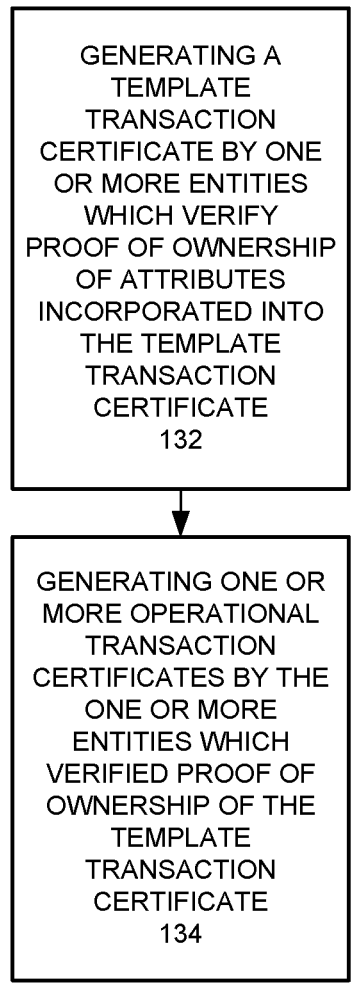
FIG. 1E illustrates a flow diagram of an example method of creating and distributing template certificates.

FIG. 1E illustrates a flow diagram of an example method of creating and distributing template certificates. Referring to FIG. 1E, the method may include generating a template transaction certificate template by one or more entities which verify proof of ownership of attributes incorporated into the template transaction certificate at operation 132, and generating one or more operational transaction certificates by the one or more entities which verified proof of ownership of the template transaction certificate at operation 134.

Figure 1F:
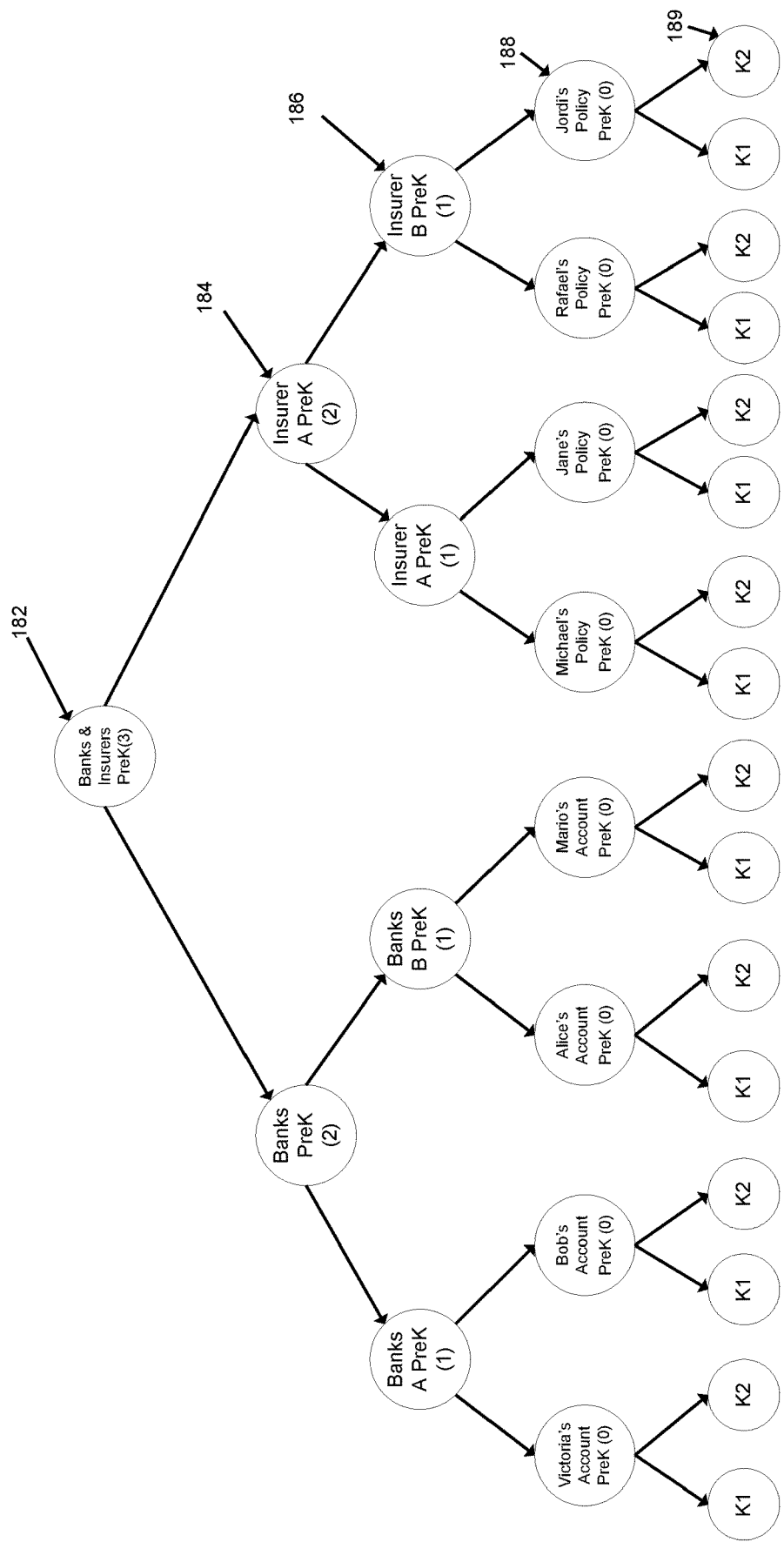
FIG. 1F illustrates another example of an audit tree according to example embodiments.

FIG. 1F specifies an example tree illustrating the hierarchy in greater detail. Referring to FIG. 1F, the top level 182 of the tree contains the root key for both industries, bank and insurance companies. The next level 184 contains the keys for all the banks (left node) and all the insurance companies (right node). Going down one additional level 186, each node contains the keys for each particular bank (i.e., Bank A and Bank B) and each particular insurance company (i.e., Insurer A and Insurer B). The next level contains the keys for each client of the banks or the insurance companies 188, and in the last level there are the keys 189 derived from the user's key to encrypt each particular attribute associated to that user. At each level the key associated with that node is the 'PreK'. For the top level 182 there is PreK(3), the next level 184 contains PreK(2), one level below that is 186 PreK(1) and at the last level 188 is PreK(0). The PreK name was selected because the keys are used as the seed to generate new keys, in that sense they are pre-keys. As an example, with PreK(3) it is possible to derive PreK(2), with PreK(2) it is possible to derive the keys for each particular bank and with Bank A's PreK(1) it is possible to derive 'Victoria's' account PreK(0) and Bob's account PreK(0). Once at the lowest level, the user owning the PreK(0) can derive particular keys to encrypt its personal attributes, for instance, 'Victoria' can derive K1 from her PreK(0) to encrypt her social security number and K2 to encrypt her account number.

It is simple to audit the PreK tree to see that having access to a key at a particular level on the tree it is possible to derive keys for lower levels. As a result, if an auditor wants to audit all the clients from Bank 'A' the auditor can request access to PreK(1) and derive the keys for each client without having access or having to derive keys for the insurance companies on the right side of the tree. Following this example, if an auditor has jurisdiction to audit all the banks in the system, the auditor can request the PreK(2) for the banks. The auditor will not be able to access or derive keys for the insurance companies.

According to one example method of operation, a transaction certificate generation may include a template transaction certificate being generated by one or more entities that directly or indirectly verify proof of ownership of the attributes that are to be incorporated into the template transaction certificate, and the operational transaction certificates are generated by one or more entities that verify proof of ownership of a template certificate. The verification of proof of ownership of attributes applies to ownership by an entity requesting issuance or generation of one or more the template transaction certificates. The generation of the template transaction certificate entails the use of threshold digital signing. The verification of proof of ownership of a template certificate applies to ownership by an entity requesting issuance or generation of one or more of the operational transaction certificates. The one or more public key certificates issued to the one or more entities that are authorized to generate a template transaction certificate includes a single public key certificate that is jointly owned via the use of threshold digital signatures. The one or more public key certificates issued to the one or more entities authorized to generate operational transaction certificates are issued by the one or more entities authorized to generate template transaction certificates.

Figure 2:
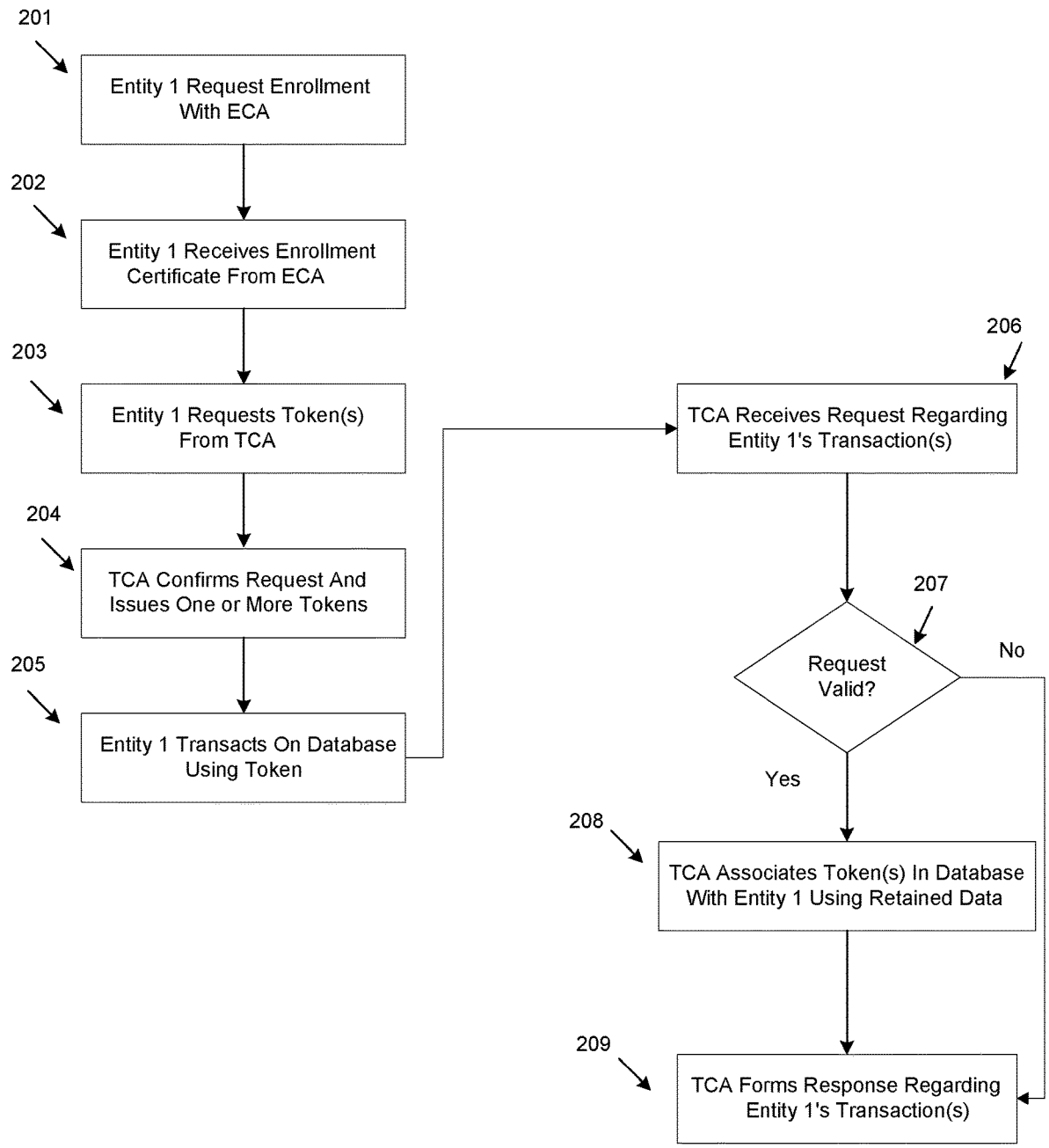
FIG. 2 illustrates an example of using tokens for distributed transaction database identity, attribute and reputation management.

Referring to FIG. 2, an embodiment implements a method wherein an entity, in this example Entity 1, requests enrollment with an ECA (e.g., ECA 103) at 201. Entity 1, if satisfying enrollment criteria of the ECA, receives an enrollment certificate from the ECA at 202. Then, Entity 1 may request token(s) from the TCA at 203. If the TCA grants the request, including for example confirming with the ECA, and/or via use of the enrollment certificate, that Entity 1 has proven its identity and is authorized to receive token(s), the TCA will confirm the request and issue one or more tokens to Entity 1 at 204. Entity 1 then may transact on the transaction database using the tokens, as illustrated at 205.

As illustrated in FIG. 2, a request and response may be implemented in order for the TCA to obtain the transaction data, e.g., entity identification, attributes, reputation scores, etc., of an entity, e.g., over some previous period of time. If the TCA receives a request at 205, for example a request for the last X transactions by Entity 1, and the TCA confirms it is a valid request at 207 (e.g., issued by an appropriate entity or authority having access to such information), the TCA and/or its delegate can systematically associate and store the transaction identifications clustered by EnrollPub_Key of Entity 1. This clustering or linking of Entity 1's transactions at 208 further enables the auditing and evaluation (e.g., reputation scoring) of the entity by the TCA (or appropriate delegate) and/or permits identification of, and conditional authorizing and processing of, an entity's transactions on the block chain. Thus, TCA may issue a response to the request at 209. If TCA deems the request is not valid at 207, a response in the form of denying the request may be sent at 209. One entity may authorize another entity to make requests on its behalf. One such means to authorize is via submitting a transaction to the transaction database or block chain. Such a transaction may be signed using TCert-Priv_Key corresponding to TCertPub_Key of a TCert that is included with or referenced by the transaction, and may include an additional TCert owned by the party to the transaction to which authorization to make a request to the TCA on behalf of or as a delegate of the transaction-submitting entity is being granted. The TCA's verification of the legitimacy of such an ensuing request can entail accessing the authorizing transaction in order to determine which entity's information to release and to determine whether the requesting entity is the same entity as that designated by the authorizing transaction as an authorized entity. This determination can be based on matching the EnrollID included (explicitly as plaintext or as an argument of a hash function or encryption algorithm) within the enrollment certificate used to make the request to the TCA against the EnrollID included as: AES_EncryptTCA_Encrypt_Key(TCertIndex-∥EnrollPub_Key∥EnrollID) within a TCert that is in the authorizing transaction as being granted access as a delegate. If the EnrollID appears as an argument of a hash function within the enrollment certificate, for example as hash (randvalue∥EnrollID), where randvalue is a randomly or pseudorandomly generated value that precludes guessing EnrollID given hash(randvalue∥EnrollID), then entity 102 can provide TCA with access to randvalue and EnrollID when requesting a batch of TCerts. TCA can check that these provided values of randvalue and EnrollID hash to the hash(randvalue EnrollID) field within the enrollment certificate. If the TCA and/or appropriate delegate wishes to obtain plaintext content or chain code (if all or part thereof is encrypted by an entity), the TCA may utilize its retention or derivation of EnrollPub_Key, i.e., the public key used by a particular entity (e.g., Entity 1 in the example of the FIG. 2), to identify the entity. If attributes and reputation scores (or other data of interest) are incorporated into tokens with TCerts, it becomes reasonable for the TCA (or whichever entity that is responsible for assigning reputation scores) to be able to directly access plaintext chain code or query those that have such direct access. In either case, the TCA can directly access the attributes and reputation scores (although these may be in encrypted form within the TCerts) if the tokens with TCerts are placed outside of the boundary of the encrypted chain code. Although the attributes and/or reputation scores may be in encrypted form within the TCerts, the TCA and/or its delegates can access the plaintext form of such attributes and/or reputation scores because of the ability to access the key used for the encryption.

In order to grant application-specific access to plaintext chain code, it may be preferable not to rely entirely on enforcement at the client application level. Such reliance would preclude the ability for appropriate entities (e.g., TCA and/or delegates) to inquire and have these inquiries completed, e.g., if a transacting entity (e.g., entity 102 of FIG. 1A) has the entity's local client deny access. The TCerts may include a field of signature verification public keys and/or of hashed signature verification public keys so that chain code validators or auditors (or other appropriate entity) that are granted direct access to chain code can determine from whom they should accept such queries for decrypted chain code. If the TCA is not granted direct access or it is otherwise determined or set by the system not to allow the TCA to unilaterally decide which entities are to be granted indirect access via query, then this field of signature verification public keys and/or of hashed signature verification public keys can be signed by another, e.g., by the ECA (103 of FIG. 1) or whichever access manager entity has been designated by the system with this responsibility. This signed field can be specific to a particular EnrollID. This field can differ according to the validity period of the TCerts. For example, an auditor may be granted access to see future plaintext chain code corresponding to a particular Enroll ID (e.g., after first being given direct access by the TCA to all or part of decrypted TCerts, and then providing justification for receiving more in-depth access). The TCA can revoke an entity's tokens with TCerts for the current validity period and issue a new TCert batch that incorporates a signature verification public key for which the auditor knows the corresponding signature generation private key. The signed field of hashed signature verification keys can include faux keys so as to not leak which or how many signature verification keys correspond to signature generation private keys are actually held. The signature verification key associated with a given agency can change over time as well in order to further obfuscate the process.

As a specific example of a signature verification, a TCert field may be included as SignAccessManagerPriv_Key ({SignatureVerificationPub_Key}), where each SignatureVerificationPub_Key or hash(SignatureVerificataionPub_Key) is included in addition to the signature generated by the Access Manager over the set of SignatureVerificationPub_Keys as denoted by {SignatureVerificationPub_Key}. Any of the corresponding signature generation private keys can be used to sign queries directed to such TCert, e.g., to receive plaintext of encrypted transaction content/chain code. The signature of such signed query is verified using one of the SignatureVerificationPub_Keys within the set of SignatureVerificationPub_Keys. Such request and response communications can be done using, e.g., a secure protocol such as the TLS protocol, where the supplier of responses to queries is authenticated using its TLS certificate.

By way of further example, a TCert may include attributes and/or reputation scores that an entity, the TCA 104, etc., may wish to access. A TCert may thus include an encrypted field containing such data, e.g., AES_EncryptEncryptAttributes_Key(Attribute(s)||Reputation Score(s)) where the TCA and/or appropriate delegate(s) retains or has access to the key, here EncryptAttributes_Key, as does the TCert owner (i.e., the entity, such as entity 102 of FIG. 1A, using the token in association with the transaction(s)), and where EncryptAttributes_Key can be made available to additional entities. For example, EncryptAttributes_Key can be made available within a transaction that is signed using an entity's private key, i.e., TCertPriv_Key, as an encryption that provides EncryptAttributes_Key to the targeted entities via decryption using an appropriate key. A possible expression for EncryptAttributes_Key is: [HMAC(TCertInfoExportKDF_Key, TCertID|"2")]256-bit truncation. Attribute(s), reputation score(s), or a part thereof, can also be encrypted by the TCA with additional key(s) for more fine-grained dissemination. For example, an entity that has access to TCertInfoExportKDF_Key for a particular entity would be able to decrypt all AES_EncryptEncryptAttributes_Key(Attribute(s)||Reputation Score(s)) contained within TCerts owned by that entity, while attributes and/or reputation score(s) may be selectively encrypted whereby some but not all TCerts owned by a particular entity include AES_EncryptKey*(Attribute(s)||Reputation Score(s)) for some key Key* provided to an entity.

Attributes and/or reputation scores may alternatively be provided in unencrypted form, e.g., where attributes are not considered sensitive information and attribute-reputation score combinations do not enable unwanted clustering by observers according to the same TCertOwner. A reputation score may be relative to specific attribute(s).

A TCert may include a field that permits the TCA 104 and/or appropriate delegate to revoke the token(s). By way of specific example, inclusion of a field such as Hash (TCertID, revocK), where revocK may differ per entity and per validity period, enables relying parties to detect whether a given token with TCert has been revoked by computing Hash(TCertID, revocK) for those values of revocK that are marked within a revocation list as being associated with the same ValidityPeriodCtr value (or validity period date-time interval) as that included within the TCert of interest, and comparing the results for a match against the value of Hash(TCertID, revocK) included within the TCert of interest. Revocation lists or sub-lists within a revocation list may be partitioned or indexed according to ValidityPeriodCtr (or validity period date-time interval) of the revoked TCerts. Revocation lists may be incorporated into a block chain and each may be restricted to a ValidityPeriodCtr range (or a minimum start date-time and maximum end date-time) to limit the size of the revocation list. The hash function may be SHA-384 or a suitable alternate.

Possible reasons for revoking a batch of currently valid TCerts that were issued using a common revocK value include but are not limited to: the reputation score(s) are no longer valid; the TCertOwner (e.g., entity 102 of FIG. 1A) enrollment certificate has been revoked by the ECA (103 of FIG. 1A) (or its delegate); and/or the TCA (104 of FIG. 1A) has reason to issue a new batch of TCerts for that TCertOwner that provides access to certain TCert fields and/or authorizes queries to a different set of auditors than in the previous batch (as discussed in connection with signature verification fields herein). A change-over from one ValidityPeriodCtr value to a new or next ValidityPeriodCtr value (or equivalently the expiration of a ValidityPeriodCtr value) can be announced on the block chain by the TCA or its delegate by having the TCA submit such a transaction to the block chain. Such a transaction can be signed by the same private key that the TCA uses to generate TCerts.

The entity (e.g., 102 of FIG. 1A) public key for a particular token, herein TCertPub_Key, is computable by the TCA and/or appropriate delegate using the stored TCA_HMAC_Key and EnrollPub_Key extracted from the entity's (TCertOwner) enrollment certificate that is included in the request for tokens. TCertPub_Key is equal to (EnrollPub_Key+ExpansionValue G), e.g., using elliptic curve scalar multiplication (with scalar ExpansionValue and curve point G, and elliptic curve point addition, e.g., per known specification). TCertPriv_Key, which is computable by TCertOwner using TCertOwnerKDF_Key (retrieved from the token batch response) and generated/stored EnrollPriv_Key, is equal to (EnrollPriv_Key+ExpansionValue) modulo n, where n may defined by a known specification. The TCertOwner need not retain TCertPriv_Key, since it is computable from the TCert.

The entity (e.g., 102 of FIG. 1A) may use TCertPriv_Key corresponding to TCertPub_Key within a TCert to digitally sign a chain code/transaction content that includes, in particular, an encryption public key or key agreement public key for which the entity has or can retrieve the corresponding decryption private key or key agreement private key. The entity may use a TCert to disseminate on the block chain an encryption public key or key agreement public key that is usable by the entity or another entity, e.g., entity N 105 of FIG. 1A, to make a key accessible to encrypt data. The key that is used to encrypt data is made accessible by encrypting that key using the encryption public key or by encrypting that key using a key that is derived from a shared secret value that results from using the key agreement public key in a suitable key agreement protocol. This enables an entity (e.g., entity 102 of FIG. 1A) to decrypt the encrypted data in order to recover the plaintext form, i.e., usable form, of the data. Such encryption public key or key agreement public key is preferably generated using a method that is the same as or similar to that used to generate the TCertPub_Key, using an index value that is the same as or related to the TCertIndex value within the TCert that accompanies the signed chain code/transaction content.

Rather than generating such key agreement public key as (EnrollPub_Key+Expansion Value G), where Expansion Value is determined from Expansion_Key=HMAC(TCertOwnerKDF_Key, "2") and some value of TCertIndex, such key agreement public key can be generated as follows.

In place of EnrollPriv_Key and corresponding EnrollPub_Key, the entity (e.g., entity 102 of FIG. 1A) may use an independently generated long-term private key and corresponding long-term public key. In place of Expansion_Key=HMAC(TCertOwnerKDF_Key, "2"), the entity may use an independently generated long-term HMAC key. Alternatively, EnrollPriv_Key and corresponding EnrollPub_Key, and Expansion_Key can be reused for this purpose if, for example, the TCA uses only odd values for the TCertIndex counter when generating tokens with TCerts so that the even values of TCertIndex are reserved for the key agreement private and public keys, such as elliptic curve Diffie-Hellman (ECDH) private and public keys. This technique enables the entity to reconstruct the key agreement private key by viewing the transaction on the block chain where, for example, the index used for the ECDH key is one higher than the TCertIndex of the TCert. More generally, this technique or a similar technique enables the entity to reconstruct the decryption private key or key agreement private key by viewing the transaction on the block chain.

As an example, two entities, e.g., entity 102 and entity 105 of FIG. 1A, that want to communicate with one another as determined based on the attributes and/or reputation scores, which may appear in the clear within the TCerts of each, and want to communicate securely using encrypted data, may use dissemination on the block chain of an encryption public key or key agreement public key. As another example, where a first of two entities (e.g., entity 102 of FIG. 1A) is aware by some means of an encryption key or key agreement public key of the second of the two entities (e.g., entity 105 of FIG. 1A), the first entity may use the encryption key or key agreement public key of the second entity (here, the intended recipient) to securely provide access to the first entity's attributes, reputation scores, EnrollID, or any other data of interest, so that the second entity can decide whether to communicate with the first entity, where such communications may occur on and/or off of the block chain (such out of band communications are illustrated in).

FIG. 1A as directly between the entities, i.e., not necessarily involving transaction database 101). If the second entity decides to communicate with the first entity, the second entity can do so using the encryption public key or key agreement public key that was provided by the first entity within the transaction that provided the second entity with access to the first entity's attributes, reputation scores, EnrollID, or any other data of interest.

An entity, e.g., entity 102 of FIG. 1A, may wish to switch to another TCert for use in transacting, e.g., switch from a first TCert to a second TCert. For example, entity 102 may wish to do so for example in the case where the first TCert has expired, i.e., the current ValidityPeriodCtr value is higher than that within the first TCert, or entity 102 may wish to obscure the fact that a future invocation of the chain code is done by the same entity that earlier deployed or invoked the chain code (where in this case, the second TCert may be incorporated into the encrypted portion of the chain code rather than being exposed). More specifically, if entity 102 wishes to hide which future invocation(s) is done by that entity, entity 102 introduces or incorporates a preferably previously unused TCert into the encrypted portion of the chain code (by proving ownership via signature of the newly introduced TCert as well as of one that is available in the clear outside of the ciphertext). The newly introduced TCert does not appear in the clear unless and until entity 102 does a future invocation that involves digitally signing using the TCertPriv_Key that corresponds to the TCertPub_Key within that particular TCert. The two TCerts are un-linkable except through either (a) access to the plaintext of the transaction that did the TCert switch-over or (b) access (by the TCA or an auditor) to the hidden information within the two TCerts that shows they belong to the same entity (e.g., same user, organization, device, or plurality thereof).

A mechanism for such switching is to have entity 102 provide two signatures, i.e., a first signature that is generated using the TCertPriv_Key of the first TCert, and a second signature that is generated using the TCertPriv_Key of the second TCert. Alternatively, entity 102 may provide a single digital signature that is generated using the modulo n sum of the two TCertPriv_Keys (i.e., of the first and second TCert), where this signature can be verified using the elliptic curve point addition of the two corresponding TCertPub_Keys.

If an entity places TCerts outside of the chain code portion, if any, that is submitted in encrypted form, this enables access to the TCerts without requiring access to the plaintext chain code. As above, this provides for the TCA and/or appropriate delegate to access these data without accessing the plaintext. All parties to a transaction (whether or not they have actually transacted on the block chain) are represented by a TCert. This enables queries to the TCA or its delegate, say for last month's transactions to which a particular entity has been a party, to be fully addressed. The one (potentially temporary) exception to placing a TCert in the clear (without adversely impacting ability to query) is to hide a pattern of chain code invocations, as above. The representation of an entity to a transaction by a TCert may be indirect in that an entity may include a signature verification public key within a transaction to be used for a specific role. For example, entity 102 may delegate calendar invites corresponding to entity 102 to be handled by an administrative assistant. A device used by such administrative assistant can generate a signature generation private key and corresponding signature verification public key, and provide the signature generation public key to entity 102 so that entity 102 can include that public key within a role delegation transaction. In an alternative embodiment, entity 102 can generate a signature generation private key and corresponding signature generation public key to be included within a role delegation transaction submitted by entity 102, where the signature generation private key is provided to a device used by the administrative assistant.

Automated chain code processing can check for a match, e.g., between a request for service with conditions relative to required attributes and/or reputation scores, and a response by an entity claiming to meet such criteria. For example, such a request may be received as the request to the TCA (or appropriate delegate) at 206 of FIG. 2, with follow-on processing as described herein to determine the response at 209.

Where the description provided herein references an ECA (e.g., ECA at 103 of FIG. 1A), it is to be understood that such enrollment certificate authority functionality can be split between an enrollment registration authority and an enrollment certificate authority, where an entity (e.g., entity 102 of FIG. 1A) communicates directly with the enrollment registration authority, and the enrollment registration authority communicates directly with the enrollment certificate authority that handles actual issuance of enrollment certificates. A TCA (e.g., TCA 104 of FIG. 1A) can be similarly split into a transaction certificate registration authority and a transaction certificate authority.

Where the description provided herein references an entity 102 requesting a batch of TCerts from a TCA, it is to be understood that a TCA can use its knowledge of TCA_Encrypt_Key and TCA_HMAC_Key, and of EnrollPub_Key and EnrollID specific to entity 102, in order to generate a batch of TCerts without necessarily processing a specific request from entity 102.

Where the description provided herein references a TCA, it is to be understood that there may be multiple such TCAs, wherein one or more such TCAs may be limited relative to the types of attributes for which it is authorized to issue TCerts and/or may be limited as to which entities or entity types (such as divided into classes of EnrollIDs) it is authorized to issue TCerts. An entity may be allowed to receive batches of TCerts from multiple such TCAs. When submitting a transaction, an entity may be allowed to incorporate multiple TCerts that it owns, potentially issued by two or more distinct TCAs. An entity can sign such a transaction using each of the TCertPriv_Keys to generate distinct signatures. Alternatively, an entity can sign such a transaction using a combination of the TCertPriv_Keys, such as the modulo n sum of such keys.

According to another example, a user may request tokens with a set of attributes. The request may include various information and may be verified by checking an encrypted and masked affiliation field for a match with an affiliation party. The attribute can be selected and the validity and ownership of the attribute can then be verified against the requesting user device. The masking and attribute encryption key is generated and the attribute is encrypted and masked accordingly. The individual encrypted and masked token can then be added and the process is completed for all attributes requested. The tokens corresponding to the attributes are established based on a root key which can be shared with the verified device.

After the sequence of operations, at a later time, an interested party (i.e. a validator or an auditor) could request access to a particular attribute. In that case the access could be to know the actual value. For example, the owner of the token may release the masking key and the interested party will compute the decryption key in order to decrypt the attribute value. In order to know if the attribute has a particular value, the owner of the token releases the encryption key and the interested party computes the masking key and encrypts and masks the presumed value for comparison with the original encrypted and masked value from the token.

Figure 3:
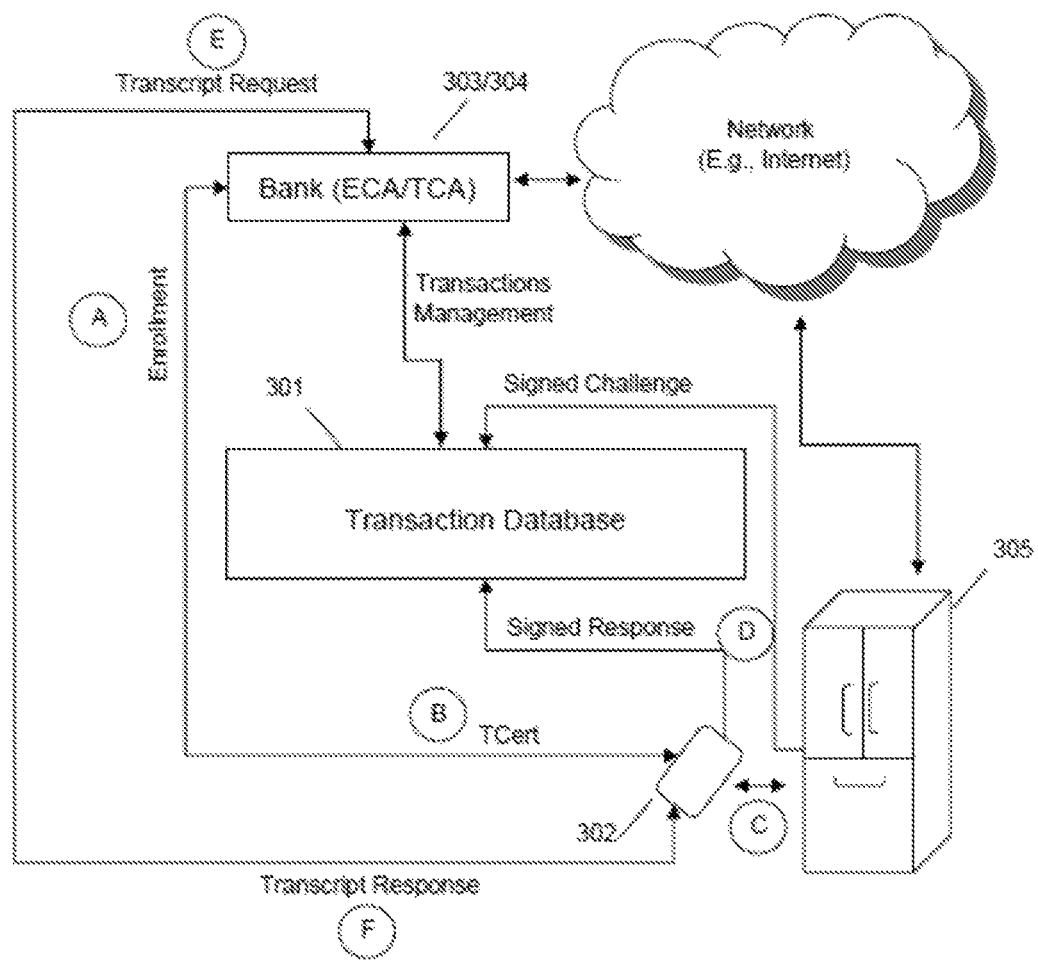
FIG. 3 illustrates an example use case for tokenized transactions.

Referring to FIG. 3, in an example use case, an embodiment provides for dynamic identities for privacy preservation, identity protection and anomaly detection. Such techniques may be used for example in connection with financial services. Referring to FIG. 3, in an enrollment process indicated at A, an entity 302 is enrolled with an enrollment certificate authority (ECA) 303, which may include a functionality of a transaction certificate authority (TCA) 304. In one example, a bank or other financial institution may act as the ECA 303. An authentication technique is established, e.g., a biometric template is initialized (if this security enhancement is offered by the bank 303). For example, biometric authentication may be periodically required in order for the entity 302 (the entity's device, e.g., a user's smart phone, etc.) to be able to access an embedded. EnrollPriv_Key to derive TCertPriv_Key from a TCert, e.g., received from a transaction certificate authority (TCA) 304, indicated at B. Such biometric authentication can be useful in that it associates the smart phone with the user in such a way that it is more difficult for a lost or borrowed phone to be used to establish patterns of activity by other than the registered user of the smart phone.

TCerts and signatures generated using TCertPriv_Keys are used to respond to close-range challenges (indicated at C) issued wirelessly by devices, e.g., Internet of Things (IoT) devices. For example, a short range wireless challenge, such as a communication facilitated by BLUETOOTH LE communication or near field communication (NFC), may be issued (and signed) by a registered device 305, e.g., a personal appliance such as a refrigerator registered to the user and having a fixed identity or identifier, where the challenges the device 305 initiates may be signed in association with long-term certificates that include the corresponding signature verification public keys. By way of specific example, a personal appliance like a refrigerator 305 may be registered to a homeowner's address upon scheduled delivery and thereafter may require appropriate authorization for registration update. The entity 302 may need to send an appropriate response at 303, e.g., facilitated using TCerts as described herein, in order to respond to the challenge issued by device 305. The device 305 may be a device that is of known static location, such as a street light pole. User interaction via entity 302 with devices of known location may be used to establish patterns of user activity.

Localized challenge-response communications may be required as a precondition and/or for audibility of certain high-value transactions. For example, a user's profile may be set such that the user's device entity 302 is in his or her kitchen when certain types of transactions are conducted. Signed challenges and signed responses are uploaded to the transaction database 301 (block chain), indicated at D. A user, e.g., associated with entity 302, may provide a full or partial transcript of his or her whereabouts during a period of interest to an institution such as a bank, e.g., by placing an appropriate query for transaction identifiers, indicated at E, to the TCA 304, and receiving a response, indicated at F, where the TCA 304 inspects transactions database 301, as described herein. In contrast, someone pretending to be the user cannot feasibly do so. Thus, the identity of the entity such as entity 302 is no longer as easy to surreptitiously obtain and fraudulently use as compared to a fixed credential such as a personal identification number, Social Security Number, or driver's license number. Rather than combining the functionality of an ECA 303 and TCA 304, as at a bank, a bank may be authorized to query a TCA regarding the transactions of all entities 302 that have enrollment certificates issued by the bank as an ECA 303. A bank or other institution associated with an ECA 303 can transfer or delegate authorization to another bank or institution to query a TCA 304 concerning entities 302 that are enrolled via ECA 303.

In one embodiment, user behavior may be considered to be anomalous even if someone claiming to be a specific user can provide data regarding that user's whereabouts, e.g., by having surreptitiously compromised EnrollPriv_Key from that user's smart phone so as to be able to successfully query the TCA as that entity 302. User behavior may be considered anomalous if it is inconsistent with that user's established patterns of activity and/or whereabouts as recorded via smart phone interaction with devices.

The description provided herein references transaction database 101 as an example of a time-sequenced immutable database implemented using a plurality of computing nodes. The nodes may be entities such as entity 102, 105 of FIG. 1A and/or other computing nodes that manage copies of the database in a distributed fashion. Certain functionality has been ascribed to various elements, e.g., the TCA 104 has been described as an entity that issues token(s) and acts to manage requests regarding tokenized transactions of the database. However, these descriptions have been provided herein for simplicity sake and it should be noted that the function(s) ascribed to a particular element or entity within the system may be performed by another or group of other system element(s).

An audit tree is independent of a transaction, i.e., by consulting TCerts on a blockchain (TCert type 2 of recipient and TCert type 1 of transaction creator). The tree is hierarchical to limit access to auditor's allowed domain/jurisdiction. This achieves that there is no leakage to the auditor of information pertaining to users outside of an auditor's jurisdiction. Representation of attributes may be encrypted and masked (possibly/potentially padded) attributes. The attribute value may be a hash, a certificate or any other derivative of the original attribute value. By using the audit tree, auditors gain access to all attributes within eligible TCerts. A TCert is eligible if the TCert owner falls within the auditor's jurisdiction(s) or domain(s). The auditor will check the TCert against all its eligible jurisdictions or domains previously stored in memory until an identification can be made or all his jurisdictions failed to check. If it gets a hit then the auditor will try to decrypt the rest of the attributes. Validators and/or recipients within the transaction receives keys to decrypt and verify attributes. The transaction creator releases these attribute specific keys. The transaction creator releases attribute specific keys for their own attributes, but it could also release attribute specific keys for the recipients provided that the recipient provides to the transaction creator these keys. Each attribute specific key is also TCert specific. Auditors have access to attribute specific keys by having access to TCert specific key and then they use that key to generate attribute specific keys. We need to maintain unlinkability even from the perspective of authorized transaction participants. Not just what the participants learn individually, also what they can do collectively if they collude. Mapping of subaccounts to one user would be hidden. However the issuing institution and the TCA know and will be able to link the subaccounts.

The participants, validators and endorsers will not have knowledge about certain information unless the user informs them directly. Using a hierarchy of trust with the public key infrastructure (PKI), the system is based on 3 types of Certificate Authorities (CA): Enrollment Certificates (ECerts), which are relatively static (long-term) certificates with user ID and affiliation, acquired via registration with an Enrollment CA (ECA), also Attribute Certificates (ACerts), which are generated after enrollment based on user ID and affiliation, Attribute certificates include enrollment public key from an enrollment certificate, acquired via an attribute CA (ACA), transaction certificates (TCerts), short-term certificates, faithfully but pseudonymously represent enrolled users, acquired via a transaction CA (TCA).

The TCA provides dynamic pseudonyms. Control points need to be performed as a result of a process of elimination. It cannot be done at the enrollment level because there is not enough knowledge at that point. The information is not available at enrollment time. It cannot be in the hands of the end users or the validators. They have the knowledge but they don't need to know that a given key belongs to a particular auditor type (i.e., law enforcement, internal auditors, etc.) such information should not be available. As an example, a given set of attributes provided by a user could indicate the corresponding group of validators. Validators and users can obtain access wrongfully, as a user can release the attributes for a validator group that is not the intended one. Validators could process it anyway, but auditors will have the required information to verify that this group of validators processed the transaction instead of the intended one. These control points will fail if they can be bypassed by using enrollment certificates instead of transaction certificates in the transactions.

Figure 4:
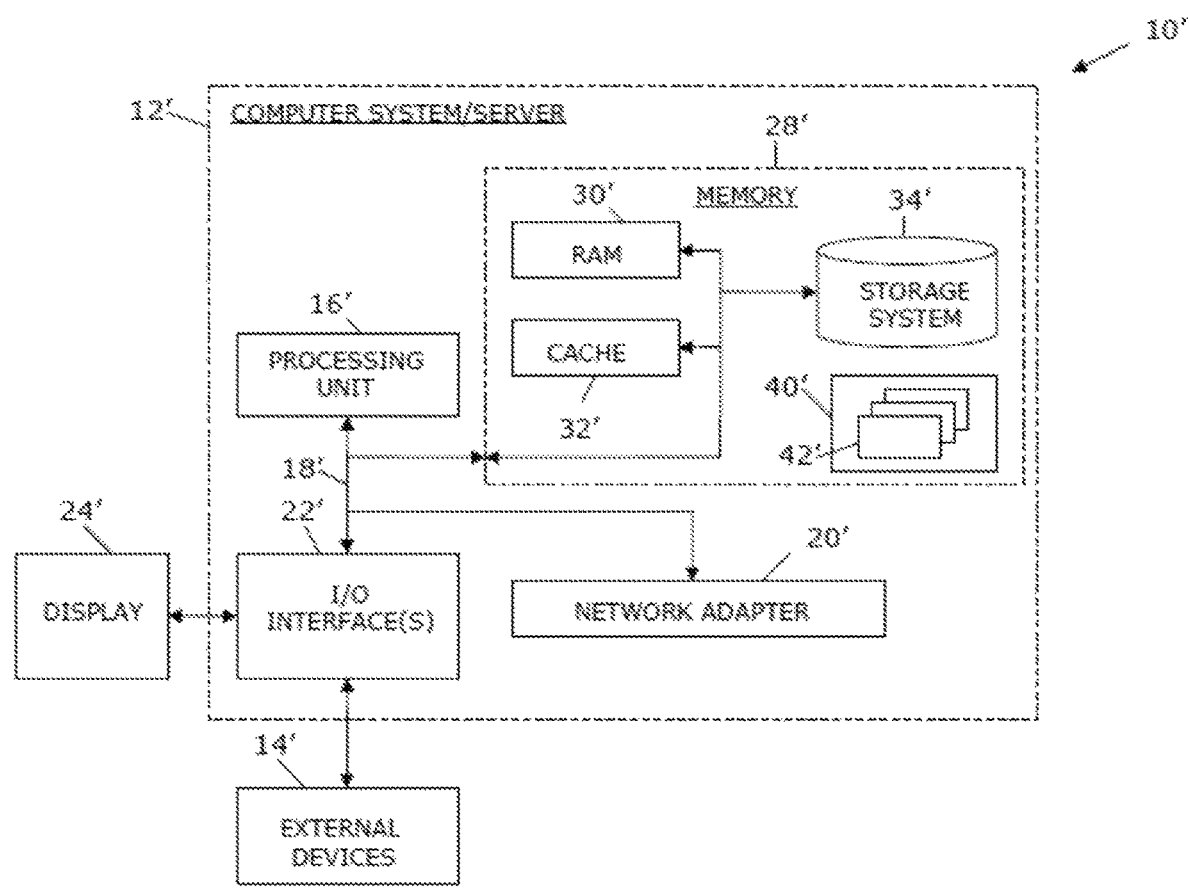
FIG. 4 illustrates a computer system configured to support one or more of the example embodiments.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/nonremovable, volatile/non-volatile computer system storage media. By way of example only, storage system 34' can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the application.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the application as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the application have been described herein with reference to the accompanying drawings, it is to be understood that the embodiments of the application are not limited to those precise embodiments, and that various other changes and modifications may be affected therein by one skilled in the art without departing from the scope or spirit of the disclosure.

The present application may be a system, a method, and/or a computer program product. The computer program product may include a computer readable storage medium (or media) having computer readable program instructions thereon for causing a processor to carry out aspects of the present application.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present application may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, programmable gate arrays (FPGA), or programmable logic arrays (PLA) may execute the computer readable program instructions by utilizing state information of the computer readable program instructions to personalize the electronic circuitry, in order to perform aspects of the present application.

Aspects of the present application are described herein with reference to flowchart illustrations and/or block diagrams of methods, apparatus (systems), and computer program products according to embodiments of the application. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present application.

In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving a request for tokens from an entity;
determining that the entity is permitted to receive tokens based on reputation data of the entity compiled from a series of transactions on a blockchain;
generating a template transaction certificate for one or more entities based on encrypted one or more attributes of the one or more entities included in the template transaction certificate to verify proof of ownership of the one or more attributes, the template transaction certificate comprising a field for storing entity reputation data, and
issuing one or more tokens for validating corresponding ones of transactions recorded in a distributed database, each of the one or more tokens including an operational transaction certificate generated based on the template transaction certificate and verifying proof of ownership of the one or more attributes of the one or more entities performing corresponding ones of the transactions.

2. The method of claim 1, further comprising:
performing a refresh operation to obtain the one or more attributes; and
retrieving the one or more attributes associated with one or more users responsive to the refresh operation being performed.

3. The method of claim 1, wherein the one or more attributes are retrieved from an attribute certificate authority.

4. The method of claim 3, further comprising responsive to retrieving the one or more attributes, returning an attribute certificate comprising an enrollment public key from an enrollment certificate acquired via the attribute certificate authority.

5. The method of claim 1, wherein at least one of the template transaction certificate or the operational transaction certificates correspond to different levels of an audit tree, the audit tree to be used by entities with different jurisdictions or levels of privacy to decrypt and recover the one or more attributes.

6. The method of claim 1, further comprising:
verifying a template transaction certificate signature of the template transaction certificate; and
generating one or more keys to access template transaction certificate attribute information associated with the one or more attributes.

7. The method of claim 6, further comprising:
concatenating a timestamp, a random value and a counter with the template transaction certificate; and
signing the template transaction certificate using a private key.

8. An apparatus, comprising:
a processor configured to
receive a request for tokens from an entity,
determine that the entity is permitted to receive tokens based on reputation data of the entity compiled from a series of transactions on a blockchain,
generate a template transaction certificate for one or more entities based on encrypted one or more attributes of the one or more entities included in the template transaction certificate to verify proof of ownership of the one or more attributes, the template transaction certificate comprising a field for storing entity reputation data, and
issue one or more tokens for validation of corresponding ones of transactions recorded in a distributed database, each of the one or more tokens including an operational transaction certificate generated based on the template transaction certificate and which verifies proof of ownership of the one or more attributes of the one or more entities performing corresponding ones of the transactions.

9. The apparatus of claim 8, wherein the processor is further configured to
perform a refresh operation to obtain the one or more attributes, and retrieve the one or more attributes associated with one or more users responsive to the refresh operation being performed.

10. The apparatus of claim 8, wherein the one or more attributes are retrieved from an attribute certificate authority.

11. The apparatus of claim 10, wherein the processor is further configured to responsive to the one or more attributes being retrieved, return an attribute certificate comprising an enrollment public key from an enrollment certificate acquired via the attribute certificate authority.

12. The apparatus of claim 8, wherein at least one of the template transaction certificate or the operational transaction certificates correspond to different levels of an audit tree, the audit tree to be used by entities with different jurisdictions or levels of privacy to decrypt and recover the one or more attributes.

13. The apparatus of claim 8, wherein the processor is further configured to
verify a template transaction certificate signature of the template transaction certificate, and
generate one or more keys to access template transaction certificate attribute information associated with the one or more attributes.

14. The apparatus of claim 13, wherein the processor is further configured to
concatenate a timestamp, a random value and a counter with the template transaction certificate, and
sign the template transaction certificate using a private key.

15. A non-transitory computer readable storage medium configured to store instructions that when executed cause a processor to perform:
receiving a request for tokens from an entity;
determining that the entity is permitted to receive tokens based on reputation data of the entity compiled from a series of transactions on a blockchain;
generating a template transaction certificate for one or more entities based on encrypted one or more attributes of the one or more entities included in the template transaction certificate to verify proof of ownership of the one or more attributes, the template transaction certificate comprising a field for storing entity reputation data, and
issuing one or more tokens for validating corresponding ones of the transactions recorded in a distributed database, each of the one or more tokens including an operational transaction certificate generated based on the template transaction certificate and verifying proof of ownership of the one or more attributes of the one or more entities performing corresponding ones of the transactions.

16. The non-transitory computer readable storage medium of claim 15, wherein the processor is further configured to perform:
performing a refresh operation to obtain the one or more attributes; and
retrieving the one or more attributes associated with one or more users responsive to the refresh operation being performed.

17. The non-transitory computer readable storage medium of claim 15, wherein the one or more attributes are retrieved from an attribute certificate authority.

18. The non-transitory computer readable storage medium of claim 17, wherein the processor is further configured to perform responsive to retrieving the one or more attributes, returning an attribute certificate comprising an enrollment public key from an enrollment certificate acquired via the attribute certificate authority.

19. The non-transitory computer readable storage medium of claim 15, wherein at least one of the template transaction certificate or the operational transaction certificates correspond to different levels of an audit tree, the audit tree to be used by entities with different jurisdictions or levels of privacy to decrypt and recover the one or more attributes.

20. The non-transitory computer readable storage medium of claim 15, wherein the processor is further configured to perform:
verifying a template transaction certificate signature of the template transaction certificate;
generating one or more keys to access template transaction certificate attribute information associated with the one or more attributes;
concatenating a timestamp, a random value and a counter with the template transaction certificate; and
signing the template transaction certificate using a private key.

* * * * *